W. J. FRANCKE.
FLEXIBLE COUPLING.
APPLICATION FILED FEB. 9, 1915. RENEWED SEPT. 21, 1916.

1,223,951.

Patented Apr. 24, 1917.
2 SHEETS—SHEET 1.

WITNESSES
H. T. Walker

INVENTOR
William J. Francke
BY
ATTORNEYS

W. J. FRANCKE.
FLEXIBLE COUPLING.
APPLICATION FILED FEB. 9, 1915. RENEWED SEPT. 21, 1916.
1,223,951.
Patented Apr. 24, 1917.
2 SHEETS—SHEET 2.
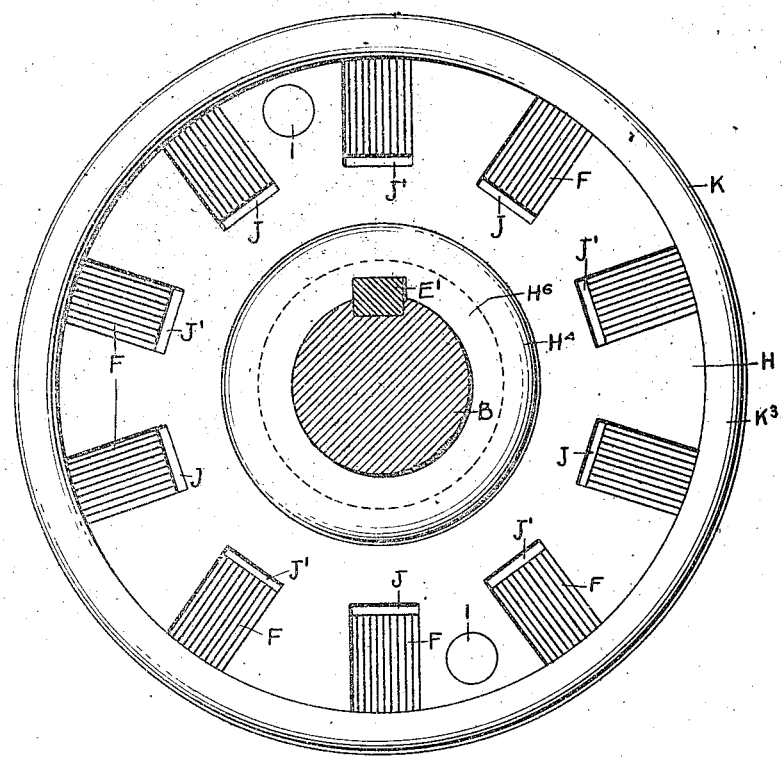
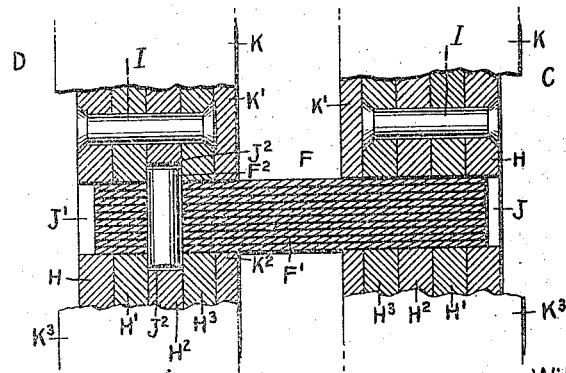

UNITED STATES PATENT OFFICE.

WILLIAM J. FRANCKE, OF HIGHLAND PARK, NEW JERSEY.

FLEXIBLE COUPLING.

1,223,951.        Specification of Letters Patent.        Patented Apr. 24, 1917.

Application filed February 9, 1915. Serial No. 7,003. Renewed September 21, 1916. Serial No. 121,507.

*To all whom it may concern:*

Be it known that I, WILLIAM J. FRANCKE, a citizen of the United States, and a resident of Highland Park, in the county of Middlesex and State of New Jersey, have invented a new and Improved Flexible Coupling, of which the following is a full, clear, and exact description.

The invention relates to flexible couplings, such as shown and described in the Letters Patent of the United States, No. 1,029,355 and No. 1,115,299, granted to me June 11, 1912, and October 27, 1914, respectively.

The object of the present invention is to provide a new and improved flexible coupling arranged to insure proper transmission of the power from one shaft to another even should such coupled shafts be out of line or out of center, to combine strength with flexibility and to reduce the cost of manufacture to a minimum.

In order to accomplish the desired result, use is made of coupling members adapted to be secured to the adjacent ends of two shafts, and flexible connecting members connecting the said coupling members with each other, one end of the connecting members being held against longitudinal movement in one coupling member and the other end being free to slide in a longitudinal direction in the other coupling member, the connecting members being held against longitudinal movement in alternate relation in the said coupling members. Use is also made of a coupling member formed of a plurality of pressed steel sections fastened together, the outermost sections of each connecting member having hubs fitting one onto the other to provide a reinforced hub for attachment to the end of a corresponding shaft.

A practical embodiment of the invention is represented in the accompanying drawings forming a part of this specification, in which similar characters of reference indicate corresponding parts in all the views.

Fig. 3 is a similar view of the same on the line 3—3 of Fig. 1; and

Fig. 4 is a sectional plan view of the same on the line 4—4 of Fig. 1.

Figure 1:
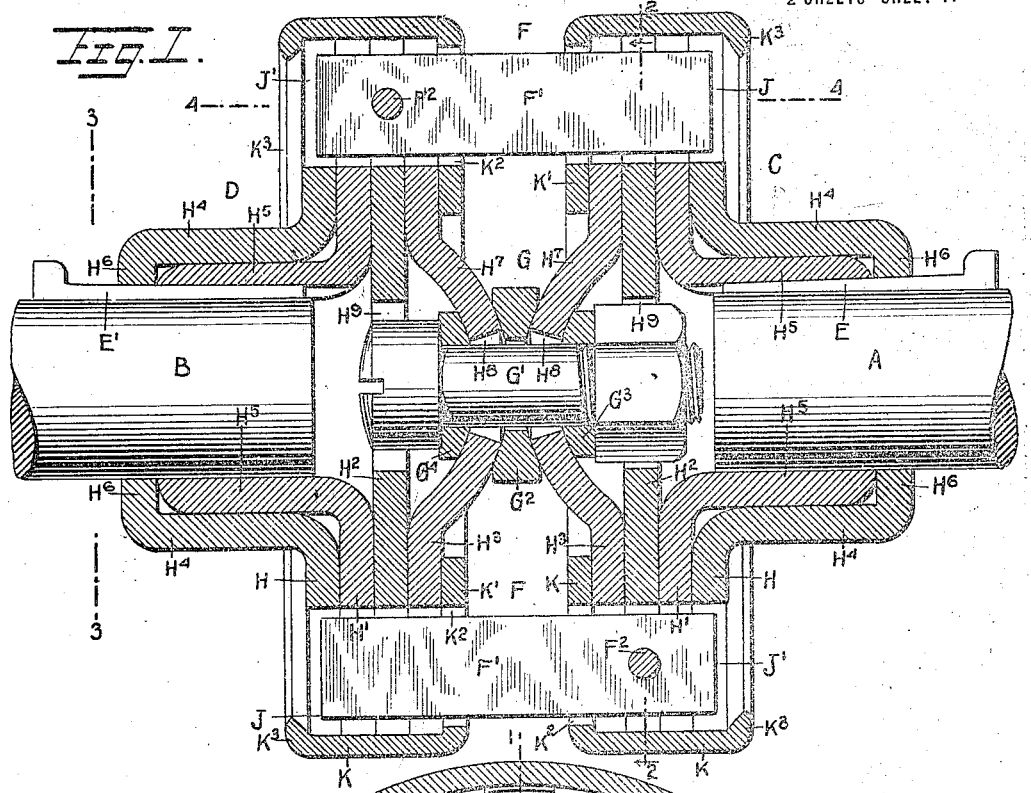
Figure 1 is a longitudinal central section of the flexible coupling on the line 1—1 of Fig. 2.

On the adjacent ends of the shafts A and B to be coupled together are secured the coupling members C and D by the use of keys or similar fastening means E, E', as plainly shown in Figs. 1 and 3. The coupling members C and D are flexibly connected with each other at their adjacent faces by the use of flexible connecting members F arranged in a circle, the center of which coincides with the axis of the corresponding shaft A or B. The coupling members C and D are also connected with each other centrally by a universal joint G.

The coupling members C and D are alike in construction and it suffices to describe but one in detail. Each of the coupling members C and D is formed of a plurality of pressed steel sections H, H', H², H³, preferably of disk form and connected with each other by rivets I or similar fastening devices, as plainly indicated in Figs. 2, 3 and 4. The hub for fastening each coupling member C or D to the corresponding shaft A or B may be formed integrally on any one of the sections, but in order to provide an exceedingly strong and durable hub I prefer to provide the outermost sections H and H' with internal hubs H⁴, H⁵ fitting one onto the other, the hub H⁴ also having an outturned flange H⁶ abutting against the outer edge of the hub H⁵. The flange H⁶ and the inner face of the hub H⁵ are provided with keyways for engagement by the corresponding key E or E', as will be readily understood by reference to Figs. 1 and 3.

Figure 2:
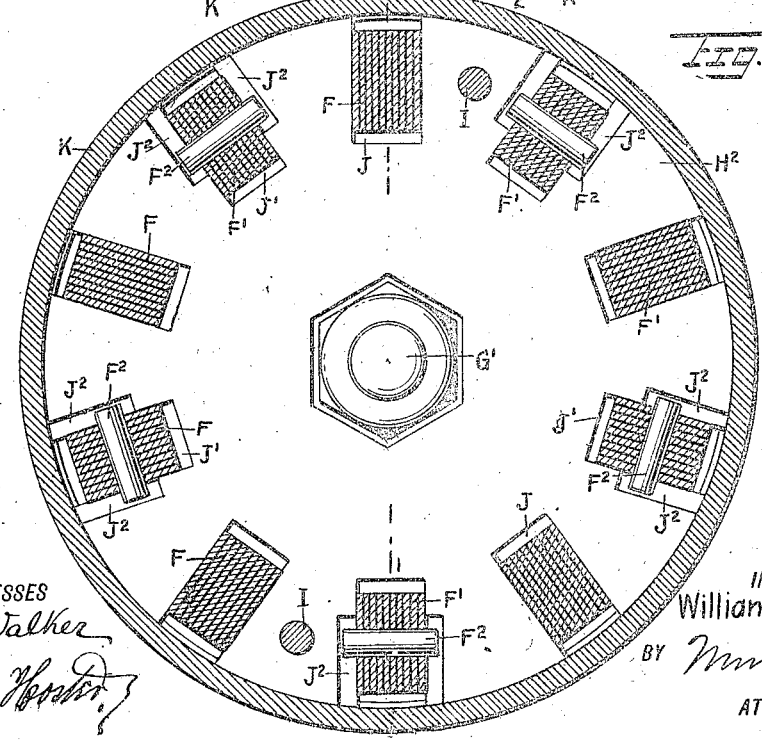
Fig. 2 is a transverse section of the same on the line 2—2 of Fig. 1.

Each of the connecting members F is formed of a plurality of superimposed flat steel springs F' connected with each other at one end by a transverse pin F² projecting beyond the outer faces of the outermost springs F', as plainly indicated in Figs. 2 and 4. Each of the coupling members C and D is provided with alternately arranged recesses J, J' extending radially inward from the peripheral faces of the coupling members, and the recesses J and J' of the two coupling members C and D are located directly opposite each other for receiving the ends of a corresponding connecting member F. The side walls of each recess J' are provided with radially disposed guideways J² formed in the section H² (see Figs. 2 and 4), into which extend the projecting ends of pins F² to hold this end of the corresponding connecting member F against longitudinal movement while the other end of the connecting member is free to slide in a corresponding recess J of the other coupling member. The outer faces of the outermost springs F' of each connecting member fit snugly against the side walls of the recesses J and J' but the top and bottom as well as the ends of each connecting member F are normally out of contact with the coupling members to allow the desired freedom of the connecting members in the coupling members with the exception of the longitudinal movement above mentioned, owing to the ends of the pins F² engaging the guideways J². It will be noticed that the pins F² of successive coupling members engage alternately the coupling members C and D to add to the flexibility of the coupling when the same is in use.

Each of the coupling members C and D is provided with a rim K, preferably made of pressed steel and fitting onto the peripheral faces of the corresponding sections H, H', H² and H³ of a coupling member. The rim K is provided with an inwardly extending flange K' fitting onto the outer face of the innermost section H³, and the rim K is also provided with a crimping flange K³ crimped onto the outer face of the outermost section H after the rim is placed in position on the corresponding coupling member. The flange K' is provided with apertures K² in register with the corresponding recesses J and J' in the coupling member C or D. By the use of the rim K the sections H, H', H² and H³ are securely held together at their peripheral faces and each coupling member is thus strongly reinforced by the use of such rim.

The universal joint G, previously mentioned, is arranged as follows: The innermost section H³ of each coupling member C and D is provided with a spherical center H⁷ having a central opening H⁸ through which extends a bolt G' which also passes through washers G², G³ and G⁴, of which the washer G² has concave faces fitting onto the outer faces of the spherical centers H⁷. The washers G³ and G⁴ have convex faces fitting against the inner faces of the said spherical centers H⁷ and the nut and the head of the bolt engage the outer faces of the said washers G³ and G⁴. The section H² of each coupling member C is provided with a central opening H⁹ to accommodate the corresponding nut or head of the bolt G', as will be readily understood by reference to Fig. 1.

From the foregoing it will be seen that the coupling members C and D can assume various positions one relatively to the other without affecting the driving connection between the members by the use of the connecting members F, as the latter are free to assume a corresponding position on a change of position in the coupling members C and D. It will also be noticed that by making each coupling member C or D of thin pressed steel sections an exceedingly strong and durable coupling member is provided and one which can be cheaply manufactured. It is understood that the sections are comparatively thin and consequently the two hub sections H⁴ and H⁵ are needed to provide the desired strength at the hub of each coupling member. By providing the coupling members C and D with recesses J and J' leading inward from the peripheral faces of the members it is evident that the connecting members F can be readily placed in position.

Having thus described my invention, I claim as new and desire to secure by Letters Patent:

1. In a flexible coupling, the combination of coupling members adapted to be secured to the adjacent ends of two shafts, and flexible connecting members connecting the said coupling members with each other, one end of the connecting members being held against longitudinal movement in one coupling member and the other end being free to slide in a longitudinal direction in the other coupling member, the connecting members being held against longitudinal movement in alternate relation in the coupling members.

2. In a flexible coupling, the combination of coupling members adapted to be secured to the adjacent ends of two shafts, and flexible connecting members each comprising a plurality of superimposed flat springs, and a pin extending through the springs at one end thereof and projecting beyond the faces of the outermost springs, the projecting ends of a pin of one connecting member engaging a coupling member to hold the connecting member against longitudinal movement, the other end of each connecting member being free to slide in the other coupling member.

3. In a flexible coupling, the combination of coupling members adapted to be secured to the adjacent ends of two shafts, and flexible connecting members each comprising a plurality of superimposed flat springs, and a pin extending through the springs at one end thereof and projecting beyond the faces of the outermost springs, the projecting ends of a pin of one connecting member engaging a coupling member to hold the connecting member against longitudinal movement, the other end of each connecting member being free to slide in the other coupling member, the pin of one connecting member engaging one coupling member, and the pin of the next following member engaging the other coupling member.

4. In a flexible coupling, the combination of coupling members adapted to be secured to the adjacent ends of two shafts, each coupling member being provided with peripheral recesses, the recesses in the coupling members being located opposite each other, and connecting members each fitting with its ends into a pair of registering recesses, each connecting member comprising a plurality of superimposed flat springs, and a transverse pin extending through one end of each connecting member, the ends of the pin engaging a coupling member and the pins engaging the coupling members in alternate relation.

5. In a flexible coupling member, the combination of coupling members adapted to be secured to the adjacent ends of two shafts, each coupling member being provided with peripheral recesses, the recesses in the coupling members being located opposite each other, the side walls of alternate recesses in each coupling member having radial guideways, the guideways of one coupling member alternating with the guideways of the other coupling member and connecting members fitting with their ends in the registering recesses of the said coupling members to connect the latter with each other, each connecting member comprising a plurality of superimposed flat springs and a transverse pin extending through one end of each connecting member, the ends of the pins engaging the said guideways.

6. In a flexible coupling, the combination of coupling members adapted to be secured to the adjacent ends of two shafts, and flexible connecting members connecting the said coupling members with each other, each coupling member being formed of a plurality of superimposed pressed steel disks fastened together face to face and one of the coupling disks having a hub for attachment to the end of a corresponding shaft.

7. A coupling provided with a coupling member formed of a plurality of superimposed pressed steel disks fastened together face to face and having a rim fitting around the peripheral faces of the disks and provided with flanges fitting respectively against the outer faces of the outermost and inner disks.

8. A coupling provided with a coupling member formed of a plurality of superimposed pressed steel disks fastened together, sundry of the disks having integral hubs fitting one into the other substantially the entire length of the hubs to provide a reinforced hub.

9. A coupling provided with a coupling member formed of a plurality of superimposed pressed steel disks fastened together, sundry of the disks having integral hubs fitting one into the other substantially the entire length of the hubs to provide a reinforced hub, the outermost hub having an inwardly bent flange fitting against the outer edge of the inner hub.

10. In a flexible coupling, the combination of coupling members adapted to be secured to the adjacent ends of two shafts, and flexible connecting members connecting the said coupling members with each other, each coupling member being formed of a plurality of pressed steel sections, the outermost sections of each coupling member having hubs fitting one into the other to provide a reinforced hub for attachment to the end of a corresponding shaft.

11. In a flexible coupling, the combination of coupling members adapted to be secured to the adjacent ends of two shafts, flexible connecting members connecting the said coupling members with each other, each coupling member being formed of a plurality of pressed steel sections fastened together, the outermost sections of each coupling member having hubs fitting one onto the other to provide a reinforced hub for attachment to the end of a corresponding shaft, and rims fitting over the peripheral faces of the sections.

12. In a flexible coupling, the combination of coupling members adapted to be secured to the adjacent ends of two shafts, flexible connecting members connecting the said coupling members with each other, each coupling member being formed of a plurality of pressed steel sections fastened together, the outermost sections of each coupling member having hubs fitting one onto the other to provide a reinforced hub for attachment to the end of a corresponding shaft, the innermost section of each coupling member having a spherical center portion, and a universal joint connecting the center portions of the coupling members with each other.

13. In a flexible coupling, the combination of coupling members adapted to be secured to the adjacent ends of two shafts, flexible connecting members connecting the said coupling members with each other, each coupling member being formed of a plurality of pressed steel sections fastened together, the outermost portions of each coupling member having hubs fitting one onto the other to provide a reinforced hub for attachment to the end of a corresponding shaft, the innermost section of each coupling member having a spherical center portion, a washer interposed between the outer faces of the center portions of the coupling members, washers fitting the inner faces of the said center portions, and a bolt extending through the said center portions and the said washers to form a universal joint connection between the coupling members.

14. In a flexible coupling, the combination of coupling members adapted to be secured to the adjacent ends of two shafts, flexible connecting members connecting the said coupling members with each other, each coupling member being formed of a plurality of pressed steel sections fastened together, the outermost sections of each coupling member having hubs fitting one onto the other to provide a reinforced hub for attachment to the end of a corresponding shaft, and a rim fitting around the peripheral faces of the sections of each coupling member, the rim having outer and inner flanges fitting against the outer faces of the outermost and innermost sections of the coupling member.

15. In a flexible coupling, the combination of coupling members adapted to be secured to the adjacent ends of two shafts, flexible connecting members connecting the said coupling members with each other, each coupling member being formed of a plurality of pressed steel sections fastened together, the outermost sections of each coupling member having hubs fitting one onto the other to provide a reinforced hub for attachment to the end of a corresponding shaft, and a rim fitting around the peripheral faces of the sections of each coupling member, the rim having outer and inner flanges fitting against the outer faces of the outermost and innermost sections of the coupling member, the inner flanges having openings for the passage of the connecting members.

In testimony whereof I have signed my name to this specification in the presence of two subscribing witnesses.

WILLIAM J. FRANCKE.

Witnesses:
   THEO. G. HOSTER,
   PHILIP D. ROLLHAUS.